Dec. 23, 1930.  J. QUINN  1,785,978
CUTTER TOOL
Filed Dec. 13, 1928
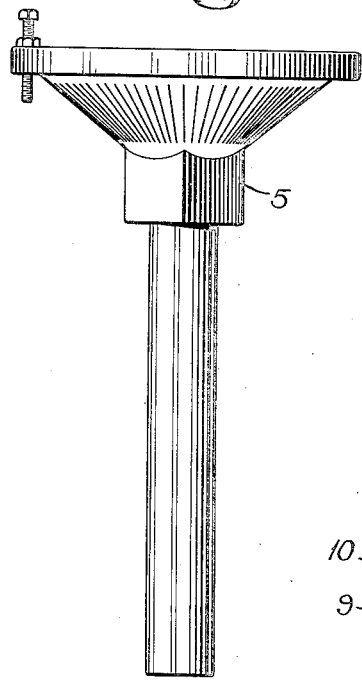
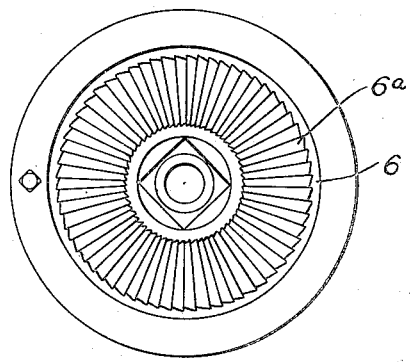
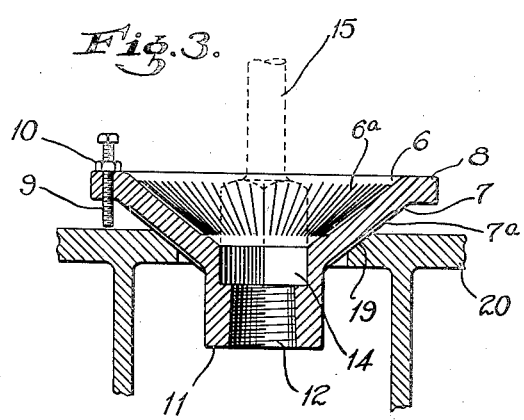
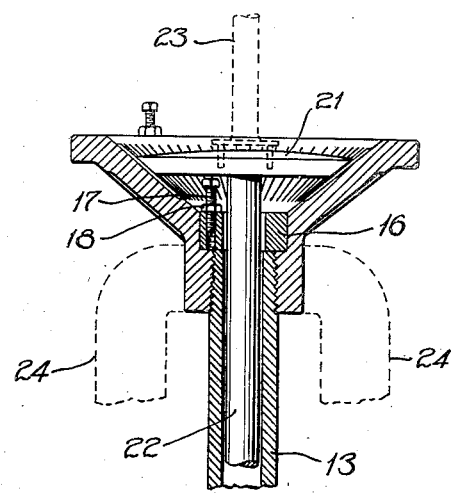
INVENTOR
Joseph Quinn
BY
ATTORNEY Patented Dec. 23, 1930

1,785,978

UNITED STATES PATENT OFFICE

JOSEPH QUINN, OF BROOKLYN, NEW YORK

CUTTER TOOL

Application filed December 13, 1928. Serial No. 325,718.

This invention relates to cutter tools and particularly to a unit tool body of substantially conical or hopper formation having parallel inner and outer side walls fashioned to form cutting surfaces to adapt the tool for use in cutting the surfaces of valves as well as the valve seats in the body in connection with which the valve operates; and the object of the invention is to provide a tool of the class specified, which will more accurately finish or cut the cooperating surfaces of a valve and valve seat and accomplish this result in a simple, practical and accurate manner; a further object being to provide a tool of the class specified which will have a comparatively wide range of use to adapt the tool for use in finishing or cutting the valve faces and valve seats of valves of varying sizes; a further object being to provide the tool with means for limiting the movement of the cutter relatively to the respective workpieces to accurately control and gage the finished size of the cut formed on the respective workpieces; a further object being to provide a tool of the class specified which may be used in refacing the valve and valve seat and operate in this manner by hand, said tool being also provided with means for guiding and supporting the same and for guiding the stem of a valve to be machined or refaced; and with these and other objects in view, the invention consists in a device of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of a tool made according to my invention.

Fig. 2 is a plan view of the structure shown in Fig. 1.

Fig. 3 is a transverse, sectional view of the tool illustrating its use in forming or refacing the valve seat in a suitable body; and, Fig. 4 is a view similar to Fig. 3 showing the use of the tool in cutting or refacing the valve.

In the accompanying drawing, I have shown for the purpose of illustrating one use of my invention, a channel body 5 which is conical or hopper-shaped in form to provide inner and outer and parallel surfaces 6 and 7 which flare outwardly from the central part of the tool body. Said surfaces are provided with circumferentially spaced and radially arranged cutter teeth 6a and 7a, the cutter teeth 6a being shown in detail in Fig. 2 of the drawing.

The outer edge of the tool body terminates in a projecting flange 8 in which is adjustably supported a gage device 9 in the form of a screw having a lock nut or other means 10 for retaining the same in different positions of adjustment.

The central portion of the channel body 5 has a downwardly directed sleeve extension 11, the outer surface of which is angular or provided with opposed flat surfaces, the sleeve 11 being square in the construction shown. This sleeve is internally threaded as seen at 12 to receive a supporting or operating tube or rod 13, the end of which is threaded to engage the threaded bore 12. Above the bore 12, is an enlarged angular bore 14 adapted to receive the angular end of an operating rod or drive member indicated at 15 in dotted lines in Fig. 3 of the drawing or to receive a gage device 16 in the form of an angular body seating in the bore 14 and having a vertically adjustable set screw 17 held in different positions of adjustment by a lock nut 18.

In the use of my improved tool in cutting or finishing the tapered valve seat 19 of a suitable workpiece or body portion 20, which for example may constitute part of the cylindrical structure of an engine or in refacing said valve seat, the tool is mounted in the position shown in Fig. 3 of the drawing, the gage device or screw 9 adjusted to limit the depth of the cut and to control the diameter of the finished valve seat 19 after which the member 15 is coupled with the angular member 14 and is rotated by hand or by a suitable turning machine to rotate the cutter tool to form the desired finish or facing of the valve seat 19. In this operation, the tube 13 may or may not be employed depending largely upon the nature of the workpiece, it being understood at this time that my improved tool may be used in cutting or refacing valve seats of devices or apparatus of any kind or class, and the structure of the tool may be made to suit the particular use thereof in different branches of commerce as to size, structure and contour, the particular angle of the surfaces 6—7 or the cutters 6a—7a being immaterial.

In the use of the tool to finish cut or face a valve 21 such for example as that shown in Fig. 4 of the drawing, the gage device 16 is mounted in position and the screw 17 adjusted to limit the inward movement of the valve and thus control the diameter of the bearing face of the valve when the complete cut has been formed. In this use of the tool, I preferably employ the tube 13, which tube may be used to guide the stem 22 of the valve, and in the operation of the tool, the valve 21 may be rotated by an operating member 23 indicated in dotted lines in Fig. 4 of the drawing, and engaging the central head portion of the valve, the cutter being held in position in a chuck, vise or the like, the jaws of which are indicated in dotted lines at 24 in Fig. 4 or if desired, the member 23 may be operated to hold the valve stationary and the tool revolved by rotating the jaw or other tool engaging members 24 as will be apparent. The operation of cutting the face of the valve 21 may be accomplished by hand or a suitable turning machine.

By employing the adjustable gage devices 9 and 16, it will be understood that the face of the valve 21 may be cut to a diameter which will accurately correspond to the diameter of the valve seat 19 formed in the workpiece, producing a complete engagement of the two beveled surfaces in the seating of the valve. It will also be understood that in cutting a large number of valve seats in one or more workpieces or in finishing or facing the valves to be used in connection with such valve seats, one adjustment of the gage devices of the tool is all that is necessary.

The one tool will serve to perform both operations in a single size production, and at the same time, the tool may be used in finishing valves and valve seats of varying sizes, it being apparent that several sizes of tools may be employed to care for the numerous ranges of valves and valve seats which are in commercial use, for example, one tool may have a range from one-half inch to an inch and one-half; another tool from one and one-half inches to three inches; and a third from three inches and over, and if desired, larger sizes may be employed.

At this time, it will also be understood that my improved tool is not necessarily limited in its use to the cutting or facing of valves and valve seats as the same may be employed in cutting or finishing tapered surfaces on one or more bodies to be coupled, regardless of the structure or general contour of such bodies, and various other changes in and modifications of the construction herein shown and described, may be made within the scope of the appended claims, without departing from the spirit of my invention or sacrificing its advantages.

Having fully described my invention, what I claim as new and desire to secure by Letters Patent, is:—

1. A tool of the class described comprising a substantially conical solid wall body, the peripheral edge of said body having a radially projecting flat circumferential flange, the inner and outer surfaces of said body having cutter teeth formed therein, the central portion of said body terminating in a projecting tubular collar, the peripheral walls of which are angular in form, and the bore of said collar being threaded and terminating at its inner end in an enlarged angular socket.

2. A tool of the class described comprising a substantially conical solid wall body, the peripheral edge of said body having a radially projecting flat circumferential flange, the inner and outer surfaces of said body having cutter teeth formed therein, the central portion of said body terminating in a projecting tubular collar, the peripheral walls of which are angular in form, the bore of said collar being threaded and terminating at its inner end in an enlarged angular socket, a tubular member fashioned to fill said socket, and a gage device adjustable with respect to said member.

In testimony that I claim the foregoing as my invention I have signed my name this 10th day of Dec. 1928.

JOSEPH QUINN.